(12) United States Patent
Li et al.

(10) Patent No.: US 10,021,023 B2
(45) Date of Patent: Jul. 10, 2018

(54) PACKET FORWARDING METHOD, CONTROLLER, FORWARDING DEVICE, AND NETWORK SYSTEM

(71) Applicant: HUAWEI TECHNOLOGIES CO., LTD., Shenzhen (CN)

(72) Inventors: Zhenbin Li, Beijing (CN); Yuanbin Yin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 112 days.

(21) Appl. No.: 15/098,790

(22) Filed: Apr. 14, 2016

(65) Prior Publication Data

US 2016/0234105 A1 Aug. 11, 2016

Related U.S. Application Data

(63) Continuation of application No. PCT/CN2013/085501, filed on Oct. 18, 2013.

(51) Int. Cl.
*H04L 12/723* (2013.01)
*H04L 12/70* (2013.01)
(Continued)

(52) U.S. Cl.
CPC ............... *H04L 45/50* (2013.01); *H04L 45/02* (2013.01); *H04L 47/00* (2013.01); *H04L 45/04* (2013.01); *H04L 45/28* (2013.01)

(58) Field of Classification Search
CPC ......... H04L 45/50; H04L 45/02; H04L 47/00; H04L 45/28; H04L 45/04
See application file for complete search history.

(56) References Cited

U.S. PATENT DOCUMENTS 9,203,702 B2 * 12/2015 Yabusaki ............ H04L 41/0893
2002/0097730 A1 7/2002 Langille et al.
(Continued)

FOREIGN PATENT DOCUMENTS

| CN | 1531278 A | 9/2004 |
|---|---|---|
| CN | 103248572 A | 8/2013 |
| CN | 103283187 A | 9/2013 |

OTHER PUBLICATIONS

International Search Report dated Jul. 16, 2014, in corresponding International Application No. PCT/CN2013/085501.
(Continued)

*Primary Examiner* — Brian O'Connor
(74) *Attorney, Agent, or Firm* — Staas & Halsey LLP

(57) ABSTRACT

A network system includes one controller and a plurality of forwarding devices, where the forwarding devices forms a plurality of network topologies; the controller is configured to: allocate, according to a different attribute requirement of a virtual link on a basic link in the network topology, a link global label to the basic link based on the attribute requirement, and send a link binding relationship between the link global label and <a network topology ID, a basic link identifier, and an attribute> to the forwarding devices, where global labels allocated to each virtual link are different; and the forwarding devices is configured to receive the link binding relationship, and generate a label forwarding entry including a mapping relationship between the link global label and virtual link forwarding information, where the virtual link forwarding information includes the basic link and specified attribute processing that are corresponding to the global label.

16 Claims, 7 Drawing Sheets

(51) Int. Cl.
*H04L 12/751* (2013.01)
*H04L 12/703* (2013.01)
*H04L 12/715* (2013.01)

(56) References Cited

U.S. PATENT DOCUMENTS

| | | |
|---|---|---|
| 2003/0137978 A1 | 7/2003 | Kanetake |
| 2013/0227108 A1* | 8/2013 | Dunbar ............... H04L 12/4633 709/223 |
| 2013/0259035 A1 | 10/2013 | Chen et al. |
| 2013/0266008 A1* | 10/2013 | Xue .................... H04L 12/4641 370/389 |
| 2013/0282867 A1 | 10/2013 | Otake |
| 2014/0369230 A1* | 12/2014 | Nallur ................... H04L 45/02 370/254 |
| 2015/0003283 A1* | 1/2015 | Previdi ................. H04L 41/12 370/254 |

OTHER PUBLICATIONS

International Search Report dated Jul. 16, 2014 in corresponding International Patent Application No. PCT/CN2013/085501.
Extended European Search Report dated Sep. 2, 2016 in corresponding European Patent Application No. 13895758.4.

* cited by examiner

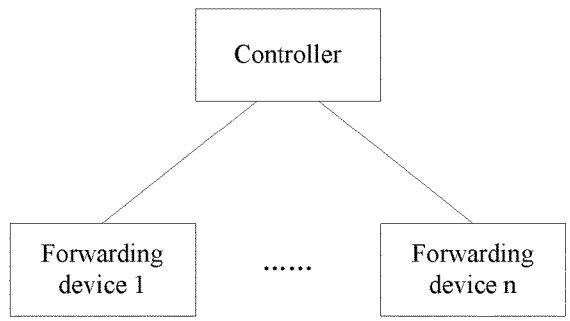

FIG. 1

| Topology ID of Virtual Network Topology | Link Global Label | Basic Link Identifier | Attribute |
|---|---|---|---|
| $TID_1$ | $L-GL_1$ | Basic link identifier 1 | Attribute 1 |
| $TID_2$ | $L-GL_2$ | Basic link identifier 2 | Attribute 2 |
| $TID_3$ | $L-GL_3$ | Basic link identifier 3 | Attribute 3 |
| ...... | ...... | ...... | ...... |
| $TID_n$ | $L-GL_n$ | Basic link identifier n | Attribute n |

FIG. 2A

| Topology ID of Virtual Network Topology | Node Global Label | Basic Node Identifier | Attribute |
|---|---|---|---|
| $TID_1$ | $N-GL_1$ | Basic node identifier 1 | Attribute 1 |
| $TID_2$ | $N-GL_2$ | Basic node identifier 2 | Attribute 2 |
| $TID_3$ | $N-GL_3$ | Basic node identifier 3 | Attribute 3 |
| ...... | ...... | ...... | ...... |
| $TID_n$ | $N-GL_n$ | Basic node identifier n | Attribute n |

FIG. 2B

| Link Global Label | Basic Link | Attribute Requirement |
|---|---|---|
| $L\text{-}GL_1$ | Basic link 1 | Attribute requirement 1 |
| $L\text{-}GL_2$ | Basic link 2 | Attribute requirement 2 |
| $L\text{-}GL_3$ | Basic link 3 | Attribute requirement 3 |
| ...... | ...... | ...... |
| $L\text{-}GL_n$ | Basic link n | Attribute requirement n |

FIG. 3A

| Node Global Label | Outbound Interface | Next Hop | Attribute |
|---|---|---|---|
| $N\text{-}GL_1$ | Outbound interface 1 | Next hop node 1 | Attribute 1 |
| $N\text{-}GL_2$ | Outbound interface 2 | Next hop node 2 | Attribute 2 |
| $N\text{-}GL_3$ | Outbound interface 3 | Next hop node 3 | Attribute 3 |
| ...... | ...... | ...... | ...... |
| $N\text{-}GL_n$ | Outbound interface n | Next hop node n | Attribute n |

FIG. 3B

| Link Global Label | Basic Link | QoS Queue ID |
|---|---|---|
| $L\text{-}GL_1$ | Basic link 1 | QoS queue 1 |
| $L\text{-}GL_2$ | Basic link 2 | QoS queue 2 |
| $L\text{-}GL_3$ | Basic link 3 | QoS queue 3 |
| ...... | ...... | ...... |
| $L\text{-}GL_n$ | Basic link n | QoS queue n |

FIG. 4A

| Link Global Label | Outbound Interface | Next Hop | QoS Queue ID |
|---|---|---|---|
| $N\text{-}GL_1$ | Outbound interface 1 | Next hop node 1 | QoS queue 1 |
| $N\text{-}GL_2$ | Outbound interface 2 | Next hop node 2 | QoS queue 2 |
| $N\text{-}GL_3$ | Outbound interface 3 | Next hop node 3 | QoS queue 3 |
| ...... | ...... | ...... | ...... |
| $N\text{-}GL_n$ | Outbound interface n | Next hop node n | QoS queue n |
FIG. 4B
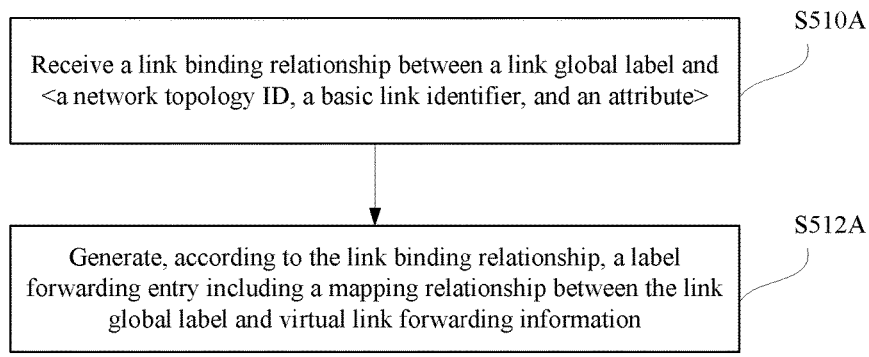
FIG. 5A
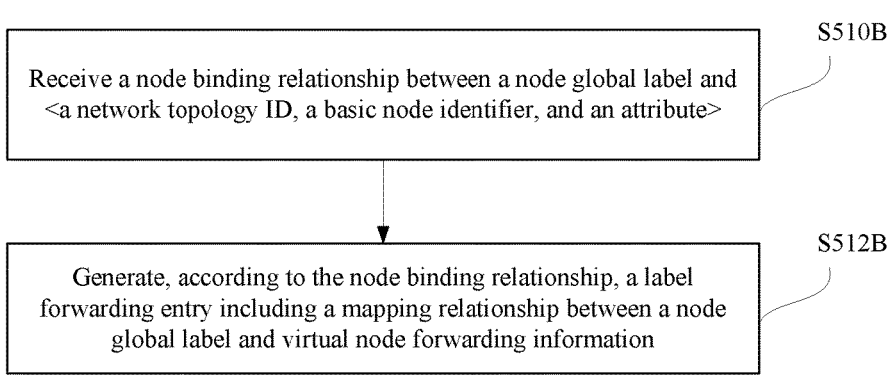
FIG. 5B

PACKET FORWARDING METHOD, CONTROLLER, FORWARDING DEVICE, AND NETWORK SYSTEM

CROSS-REFERENCE TO RELATED APPLICATIONS

This application is a continuation of International Application No. PCT/CN2013/085501, filed on Oct. 18, 2013, which is hereby incorporated by reference in its entirety.

TECHNICAL FIELD

Embodiments of the present invention relate to a packet forwarding method, a controller, a forwarding device, and a network system.

BACKGROUND

Virtual operators are now on the rise and they operate services by using virtual networks provided by infrastructure network operators.

From virtual operators' point of view, they hope to see an independent network, to perform management and maintenance and carry out service operation. However, from infrastructure network operators' point of view, they do not hope to expose details of an infrastructure physical network to virtual operators. Therefore, virtualization of a network needs to be implemented in a better manner.

Basic components of a network are links and nodes, and therefore, if a network needs to be constructed, a better method for virtualization of network nodes and links is required.

Currently, an acknowledged good method for implementing a virtual network is using an MPLS technology. A VPN itself is a virtual network by concept, and many VPNs have been deployed. What a virtual operator needs is not only virtualization of an edge service network, but construction of a virtual infrastructure network on an infrastructure physical network for operation.

Currently, a Virtual Network Operator (VNO) is limited by the following:

1. Traffic and data information of an interior node cannot be obtained, and a value-added model cannot be developed.

2. On a conventional VPN, the VNO is only allowed to see a big Pipe, but cannot control or manage an interior node.

3. A conventional technology cannot implement node and link virtualization, and cannot provide a flexible virtual network.

4. Programming is not enabled.

5. Centralized control is not supported.

For an existing network virtualization technology, a granularity of network node and link virtualization is too coarse, and therefore, a complete virtual network cannot be formed.

SUMMARY

Embodiments of the present invention aim to provide a packet forwarding method, a device, and a network system, to improve efficiency of network virtualization.

To achieve the foregoing objective, the following technical solutions are used in the embodiments of the present invention:

According to a first aspect, an embodiment of the present invention provides a network system. The network system includes at least one controller and a plurality of forwarding devices, where the plurality of forwarding devices forms a plurality of network topologies;

the at least one controller is configured to allocate, according to a different attribute requirement of a virtual link on a basic link in the network topology, a link global label to the basic link in the network topology based on the attribute requirement; and send a link binding relationship between the link global label and <a network topology ID, a basic link identifier, and an attribute> to the plurality of forwarding devices, where a link global label allocated to each virtual link is different; and the plurality of forwarding devices is configured to receive the link binding relationship, and generate, according to the link binding relationship, a label forwarding entry including a mapping relationship between the link global label and virtual link forwarding information, where the virtual link forwarding information includes the basic link and specified attribute processing that are corresponding to the link global label.

In a first possible implementation manner of the first aspect, the link global label includes two or more than two labels.

With reference to the first aspect or the first possible implementation manner of the first aspect, in a second possible implementation manner of the first aspect, the controller includes: a link global label allocating module and a link binding relationship sending module, where the link global label allocating module is configured to allocate, according to a different attribute requirement of a virtual link on a basic link in the network topology, a link global label to the basic link in the network topology based on the attribute requirement, where a virtual global node allocated by the controller to each virtual link is different; and the link binding relationship sending module is configured to send, to the plurality of forwarding devices, the link binding relationship that is formed after the link global label allocating module allocates the link global label.

With reference to the first aspect, or the first or second possible implementation manner of the first aspect, in a third possible implementation manner of the first aspect, the forwarding device includes: a receiving module, a label forwarding entry generating module, and a forwarding module, where the receiving module is configured to receive the link binding relationship between the link global label and the virtual link;

the label forwarding entry generating module is configured to generate, according to the link binding relationship, a label forwarding entry including the mapping relationship between the link global label and the virtual link forwarding information; and the forwarding module is configured to: when a first packet received by the forwarding device carries a first link global label, find, by searching according to the first link global label, a first label forwarding entry corresponding to the first link global label, to determine forwarding information of a first virtual link corresponding to the first link global label, perform first attribute processing corresponding to the first link global label, and forward the first packet from a basic link corresponding to the first link global label.

With reference to the third possible implementation manner of the first aspect, in a fourth possible implementation manner of the first aspect, the forwarding device further includes a link label adding module; and in Segment Routing (SR) forwarding, when one of the plurality of forwarding devices, as an ingress forwarding device, determines that a received second packet is to pass through the basic link in the network topology and is to be forwarded based on a second attribute requirement, the link label adding module adds, to the second packet, a second link global label allocated for <the network topology ID, the basic link identifier, and a second attribute>.

With reference to the first aspect or the first possible implementation manner of the first aspect, in a fifth possible implementation manner of the first aspect, the controller includes: a first processor and a first interface, where the first processor is configured to allocate, according to a different attribute requirement of a virtual link on a basic link in the network topology, a link global label to the basic link in the network topology based on the attribute requirement; and the first interface is configured to send, to the plurality of forwarding devices, the link binding relationship that is formed after the first processor allocates the link global label.

With reference to the first aspect, or the first, second, or fifth possible implementation manner of the first aspect, in a sixth possible implementation manner of the first aspect, the forwarding device includes: a second interface, a second processor, and a third processor, where the second interface is configured to receive the link binding relationship between the link global label and <the network topology ID, the basic link identifier, and the attribute>;

the second processor is configured to generate, according to the link binding relationship, a label forwarding entry including the mapping relationship between the link global label and the virtual link forwarding information, where the virtual link forwarding information includes the basic link and the specified attribute processing that are corresponding to the link global label; and the third processor is configured to: when a first packet received by the forwarding device carries a first link global label, find, by searching according to the first link global label, a first label forwarding entry corresponding to the first link global label, to determine forwarding information of a first virtual link corresponding to the first link global label, perform first attribute processing corresponding to the first link global label, and forward the first packet from a basic link corresponding to the first link global label.

With reference to the sixth possible implementation manner of the first aspect, in a seventh possible implementation manner of the first aspect, the forwarding device further includes a fourth processor; and in segment routing Segment Routing forwarding, when one forwarding device of the plurality of forwarding devices, as an ingress forwarding device, determines that a received second packet is to pass through the basic link in the network topology and is to be forwarded based on a second attribute requirement, the fourth processor adds, to the second packet, a second link global label allocated for <the network topology ID, the basic link identifier, and a second attribute>.

With reference to the first aspect, or the first, second, third, fourth, fifth, sixth, or seventh possible implementation manner of the first aspect, in an eighth possible implementation manner of the first aspect, the attribute is a Multi-Protocol Label Switching Tunnel Engineering MPLS TE attribute.

With reference to the eighth possible implementation manner of the first aspect, in a ninth possible implementation manner of the first aspect, the MPLS TE attribute includes one or more of the following: bandwidth, explicit path, color, protection, fast reroute FRR, and shared risk link group SRLG.

According to a second aspect, an embodiment of the present invention provides a network system. The network system includes at least one controller and a plurality of forwarding devices, where the plurality of forwarding devices forms a plurality of network topologies;

the at least one controller is configured to: allocate, according to a different attribute requirement of a virtual node on a basic node in the network topology, a node global label to the basic node in the network topology based on the attribute requirement; and send a node binding relationship between the node global label and <a network topology ID, a basic node identifier, and an attribute> to the plurality of forwarding devices, where a node global label allocated to each virtual link is different; and the plurality of forwarding devices is configured to receive the node binding relationship, and generate, according to the node binding relationship, a label forwarding entry including a mapping relationship between the node global label and virtual node forwarding information, where the virtual node forwarding information includes the basic node and specified attribute processing that are corresponding to the node global label.

In a first possible implementation manner of the second aspect, the link global label includes two or more than two labels.

With reference to the second aspect or the first possible implementation manner of the second aspect, in a second possible implementation manner of the second aspect, the controller includes: a node global label allocating module and a node binding relationship sending module, where the node global label allocating module is configured to allocate, according to a different attribute requirement of a virtual node on a basic node in the plurality of network topologies, a node global label to the basic node in the plurality of network topologies based on the attribute requirement, where node global labels allocated to the plurality of virtual nodes are different; and the node binding relationship sending module is configured to send, to the plurality of forwarding devices, the node binding relationship that is between the node global label and <the network topology ID, the basic node identifier, and the attribute> and formed after the node global label allocating module allocates the node global label.

With reference to the second aspect, or the first or second possible implementation manner of the second aspect, in a third possible implementation manner of the second aspect, the forwarding device includes: a receiving module, a label forwarding entry generating module, and a forwarding module, where the receiving module is configured to receive the node binding relationship between the node global label and <the network topology ID, the basic node identifier, and the attribute>;

the label forwarding entry generating module is configured to generate, according to the node binding relationship, a label forwarding entry including the mapping relationship between the node global label and the virtual node forwarding information, where the virtual node forwarding information includes the basic node and the specified attribute processing that are corresponding to the node global label; and the forwarding module is configured to: when a first packet received by the receiving module carries a first node global label, find, by searching according to the first node global label, a first label forwarding entry corresponding to the first node global label, to determine forwarding information of a first virtual node corresponding to the first node global label, perform first attribute processing corresponding to the first node global label, and forward the first packet according to outbound interface and next hop information of an arrived-at basic node corresponding to the first node global label.

With reference to the third possible implementation manner of the second aspect, in a fourth possible implementation manner of the second aspect, the forwarding device further includes a node label adding module; and in segment routing Segment Routing forwarding, when one forwarding device of the plurality of forwarding devices, as an ingress forwarding device, determines that a received second packet is to pass through the basic node in the network topology and is to be forwarded based on a second attribute requirement, the node label adding module adds, to the second packet, a second node global label that is of a second virtual node and is allocated for <the network topology ID, the basic node identifier, and a second attribute>.

With reference to the second aspect or the first possible implementation manner of the second aspect, in a fifth possible implementation manner of the second aspect, the controller includes a first processor and a first interface, where the first processor is configured to allocate, according to a different attribute requirement of a virtual node on a basic node in the network topology, a node global label to the basic node in the network topology based on the attribute requirement; and the first interface is configured to send, to the plurality of forwarding devices, the node binding relationship that is formed after the first processor allocates the node global label.

With reference to the second aspect, or the first, second, or fifth possible implementation manner of the second aspect, in a sixth possible implementation manner of the second aspect, the forwarding device includes a second interface, a second processor, and a third processor, where the second interface is configured to receive the node binding relationship between the node global label and <the network topology ID, the basic node identifier, and the attribute>;

the second processor is configured to generate, according to the node binding relationship, a label forwarding entry including the mapping relationship between the node global label and the virtual node forwarding information, where the virtual node forwarding information includes the basic node and the specified attribute processing that are corresponding to the node global label; and the third processor is configured to: when a first packet received by the second interface carries a first node global label, find, by searching according to the first node global label, a first label forwarding entry corresponding to the first node global label, to determine forwarding information of a first virtual node corresponding to the first node global label, perform attribute processing corresponding to the first node global label, and forward the first packet according to outbound interface and next hop information of an arrived-at basic node corresponding to the first node global label.

With reference to the sixth possible implementation manner of the second aspect, in a seventh possible implementation manner of the second aspect, the forwarding device further includes a fourth processor; and in segment routing Segment Routing forwarding, when the forwarding device, as an ingress forwarding device, determines that a received second packet is to pass through the basic node in the network topology and is to be forwarded based on a second attribute requirement, the fourth processor adds, to the second packet, a second node global label allocated for <the network topology ID, the basic node identifier, and a second attribute>.

With reference to the second aspect, or the first, second, third, fourth, fifth, sixth, or seventh possible implementation manner of the second aspect, in an eighth possible implementation manner of the second aspect, the attribute is a Multi-Protocol Label Switching Tunnel Engineering MPLS TE attribute.

With reference to the eighth possible implementation manner of the second aspect, in a ninth possible implementation manner of the second aspect, the MPLS TE attribute includes one or more of the following: bandwidth, explicit path, color, protection, fast reroute FRR, and shared risk link group SRLG.

According to a third aspect, an embodiment of the present invention provides a packet forwarding method, where the method is applied to a network system including at least one controller and a plurality of forwarding devices, and the plurality of forwarding devices forms a plurality of network topologies; and the method includes:

receiving a link binding relationship between a link global label and <a network topology ID, a basic link identifier, and an attribute>; and generating, according to the link binding relationship, a label forwarding entry including a mapping relationship between the link global label and virtual link forwarding information, where the virtual link forwarding information includes a basic link and specified attribute processing that are corresponding to the link global label; the link binding relationship is that the at least one controller allocates, according to a different attribute requirement of a virtual link on a basic link in the network topology, a link global label to the basic link in the network topology based on the attribute requirement, and sends a link binding relationship between the link global label and <a network topology ID, a basic link identifier, and an attribute> to the plurality of forwarding devices; and a link global label allocated to each virtual link is different.

In a first possible implementation manner of the third aspect, when a first packet received by the forwarding device carries a first link global label, the forwarding device finds, by searching according to the first link global label, a label forwarding entry corresponding to the first link global label, to determine forwarding information of a first virtual link corresponding to the first link global label, perform first attribute processing corresponding to the first link global label, and forward the first packet from a basic link corresponding to the first link global label.

With reference to the third aspect, or the first possible implementation manner of the third aspect, in a second possible implementation manner of the third aspect, in segment routing Segment Routing forwarding, when one forwarding device of the plurality of forwarding devices, as an ingress forwarding device, determines that a received second packet is to pass through the basic link in the network topology and is to be forwarded based on a second attribute requirement, a second link global label allocated for <the network topology ID, the basic link identifier, and a second attribute> needs to be added to the packet.

With reference to the third aspect, or the first or second possible implementation manner of the third aspect, in a third possible implementation manner of the third aspect, the attribute is a Multi-Protocol Label Switching Tunnel Engineering MPLS TE attribute.

With reference to the third possible implementation manner of the third aspect, in a fourth possible implementation manner of the third aspect, the MPLS TE attribute includes one or more of the following: bandwidth, explicit path, color, protection, fast reroute FRR, and shared risk link group SRLG.

According to a fourth aspect, an embodiment of the present invention provides a packet forwarding method, where the method is applied to a network system including at least one controller and a plurality of forwarding devices, and the plurality of forwarding devices forms a plurality of network topologies; and the method includes:

receiving a node binding relationship between a node global label and <a network topology ID, a basic node identifier, and an attribute>; and generating, according to the node binding relationship, a label forwarding entry including a mapping relationship between the node global label and virtual node forwarding information, where the virtual node forwarding information includes outbound interface and next hop information of an arrived-at basic node, and specified attribute processing that are corresponding to the node global label; the node binding relationship is that the at least one controller allocates, according to a different attribute requirement of a virtual node on a basic node in the network topology, a node global label to the basic node in the network topology based on the attribute requirement, and sends a node binding relationship between the node global label and <a network topology ID, a basic node identifier, and an attribute> to the plurality of forwarding devices; and a node global label allocated to each virtual node is different.

In a first possible implementation manner of the fourth aspect, when a first packet received by the forwarding device carries a first node global label, the forwarding device finds, by searching according to the first node global label, a label forwarding entry corresponding to the first node global label, to determine forwarding information of a first virtual node corresponding to the first node global label, perform first attribute processing corresponding to the first node global label, and forward the first packet from a basic node corresponding to the first node global label.

With reference to the fourth aspect, or the first possible implementation manner of the fourth aspect, in a second possible implementation manner of the fourth aspect, in segment routing Segment Routing forwarding, when a forwarding device A, as an ingress forwarding device, determines that a received second packet is to pass through the basic node in the network topology and is to be forwarded based on a second attribute requirement, a second node global label allocated for <the network topology ID, the basic node identifier, and a second attribute> needs to be added to the packet.

With reference to the fourth aspect, or the first or second possible implementation manner of the fourth aspect, in a third possible implementation manner of the fourth aspect, the attribute is a Multi-Protocol Label Switching Tunnel Engineering MPLS TE attribute.

With reference to the third possible implementation manner of the fourth aspect, in a fourth possible implementation manner of the fourth aspect, the MPLS TE attribute includes one or more of the following: bandwidth, explicit path, color, protection, fast reroute FRR, and shared risk link group SRLG.

According to the packet forwarding method, the controller, and the forwarding device in the embodiments of the present invention, global labels are distributed by using an IGP extension, to implement virtualization of network links and nodes, and then, an MPLS virtual network can be easily implemented. Because MPLS global labels are used for identification, physical details of an infrastructure network are totally concealed from an upper-layer virtual network, and the upper-layer virtual network does not need to perceive whether a type of an interface on a lower link is of an Ethernet, POS or Trunk interface, which is more secure and makes a virtual network more easily operated. These virtual nodes and links can be used based on an existing outbound interface link of routing/Label Switched Path (LSP) forwarding, and can also be used based on Source Routing proposed in Segment Routing. Because concepts such as bandwidth are included in a virtual link or node herein, Segment Routing with end-to-end QoS assurance can be further implemented.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 1 is a schematic structural diagram of a network system according to an embodiment of the present invention;

FIG. 2A is a schematic diagram of a link binding relationship table according to an embodiment of the present invention;

FIG. 2B is a schematic diagram of a node binding relationship table according to an embodiment of the present invention;

FIG. 3A is a schematic diagram of a label forwarding entry corresponding to a link global label according to an embodiment of the present invention;

FIG. 3B is a schematic diagram of a label forwarding entry corresponding a node global label according to an embodiment of the present invention;

FIG. 4A is a schematic diagram of another label forwarding entry corresponding to a link global label according to an embodiment of the present invention;

FIG. 4B is a schematic diagram of another label forwarding entry corresponding a node global label according to an embodiment of the present invention;

FIG. 5A is a schematic flowchart of a packet forwarding method according to an embodiment of the present invention;

FIG. 5B is a schematic flowchart of another packet forwarding method according to an embodiment of the present invention;

DESCRIPTION OF EMBODIMENTS

Figure 6:
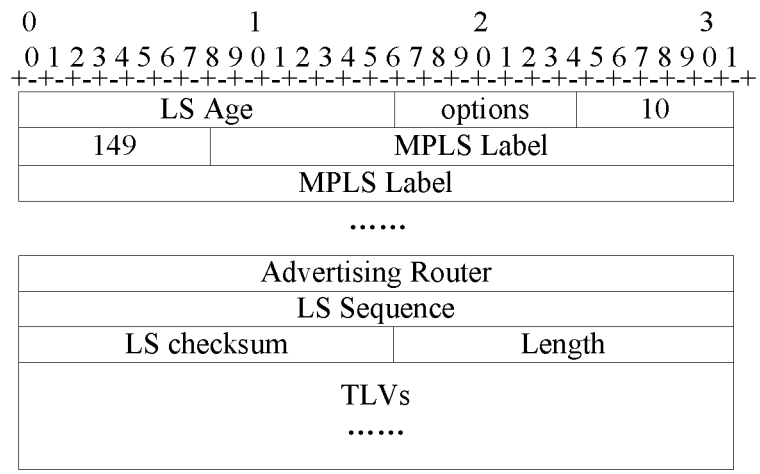
FIG. 6 is a schematic diagram of a TLV format of an example in which MPLS network virtualization is implemented by using an OSPF extension according to an embodiment of the present invention.

To make the objectives, technical solutions, and advantages of the present invention more comprehensible, the following describes the technical solutions in detail according to the embodiments of the present invention with reference to the accompanying drawings in the embodiments of the present invention. Apparently, the embodiments in the following description are merely a part rather than all of the embodiments of the present invention. All other embodiments obtained by a person of ordinary skill in the art based on the embodiments of the present invention without creative efforts shall fall within the protection scope of the present invention.

"Forwarding devices" and "clients" mentioned in the embodiments of the present invention all support a multi-topology (multi-topology) technology, an FIB (Forwarding Information Base) may be installed for a plurality of topologies, that is, each of the "forwarding devices"/"clients" has a plurality of forwarding instances (forwarding instance). Each forwarding instance corresponds to a virtual network topology (virtual network topology) or a physical topology.

An Interior Gateway Protocol (IGP) is a protocol that is dedicated to exchanging data circulation path information between gateways within an autonomous network system (for example, an autonomous network system within a range of a local community). The Internet Protocol (Internet Protocol, IP) or another network protocol usually determines, according to the path information, how a data flow is transmitted. IGPs include: Routing Information Protocol (Routing Information Protocol, RIP), Open Shortest Path First (Open Shortest Path First, OSPF), Interior Gateway Routing Protocol (Interior Gateway Routing Protocol, IGRP), Enhanced Interior Gateway Routing Protocol (Enhanced Interior Gateway Routing Protocol, EIGRP), Intermediate System to Intermediate System (Intermediate System to Intermediate System, IS-IS), and the like.

In the embodiments of the present invention, a "virtual link" is a logical link that has an attribute and is constructed based on a basic link in a specified network topology (assuming it is a first network topology). After being constructed, the virtual link may be used in the first network topology, and may also be used in a second network topology based on the first network topology. Then, based on this, a few concepts may further be defined: a "basic link" refers to a specified link in a network topology; and a "virtual link" is constructed on the basic link and has attribute A, or a basic link with attribute A. In the embodiments of the present invention, one virtual link with attribute A may be constructed on N basic links, and a link global label is allocated to the virtual link with attribute A, or M virtual links with attribute B may be constructed on one basic link, and different link global labels are allocated to the M virtual links with attribute B, where both M and N are natural numbers. For example, if an interface on a basic link is a Trunk interface, it is possible that M virtual links with attribute C are constructed on N basic links. The basic link may be one or more physical links, or may be one or more virtual links.

In the embodiments of the present invention, a "virtual node" refers to a logical node that has an attribute and is constructed based on one or some basic node devices in a specified network topology (assuming it is a first network topology). After being constructed, the virtual node may be used in the first network topology, and may also be used in a second network topology constructed on the first network topology. Then, based on this, a few concepts may further be defined: a "basic node" refers to one or more specified node devices in a network topology; and a "virtual node" is constructed on a basic node device and has attribute A, or a basic node with attribute A. In the embodiments of the present invention, one virtual node with attribute A may be constructed on N basic nodes, and a node global label is allocated to the virtual node with attribute A, or M virtual nodes with attribute B may be constructed on one basic node, and different node global labels are allocated to the M virtual nodes with attribute B, where both M and N are natural numbers. The basic node may be one or more physical node devices, for example, a forwarding device, or may be one or more virtual nodes.

As shown in FIG. 1, a network system according to an embodiment of the present invention includes at least one controller and a plurality of forwarding devices, where the plurality of forwarding devices forms a plurality of network topologies, and the plurality of network topologies may include a physical network topology and a virtual network topology.

The at least one controller is configured to allocate, according to a different attribute requirement of a virtual link on a basic link in the network topology, a link global label to the basic link in the network topology based on the attribute requirement. For example, if an attribute required by a virtual link for a basic link in a first network topology with a topology ID $TID_1$ is A, a link global label $L\text{-}GL_1$ is allocated to the basic link in the first network topology based on attribute A. In this case, the link global label $L\text{-}GL_1$ represents a virtual link in the first network topology, and the virtual link is constructed on a basic link in the first network topology and has attribute A. Then, a network topology ID, a link global label, a basic link identifier, and an attribute can form a binding relationship between the link global label and <the network topology ID, the basic link identifier, and the attribute>, and the binding relationship is called "link binding relationship" hereinafter. Specifically, if the attribute is a bandwidth attribute in MPLS TE attributes, the link binding relationship is a binding relationship between a link global label and <a network topology ID, a basic link identifier, and bandwidth>, where the link global label represents a virtual link, and the virtual link is constructed on the basic link in the first network topology and has specified bandwidth.

Optionally, the controller may be an IGP controller, the attribute may be an MPLS TE attribute, and the MPLS TE attribute may include one or more of the following: bandwidth, explicit path, color, protection, FRR (Fast ReRoute), and SRLG (Shared Risk Link Group). The forwarding device may be an IGP client, and the IGP client may be a router, a switch, or a server.

The at least one controller sends the link binding relationship to the plurality of forwarding devices.

For example, in an autonomous system, N forwarding devices form X network topologies. For a segment of basic link in a network topology (for example, a first network topology), because a virtual link may have an attribute requirement, for example, requiring a bandwidth of 1 Gbit/s, on the basic link in the network topology (for example, the first network topology), a controller needs to allocate a link global label to the basic link in the network topology (for example, the first network topology) based on the bandwidth requirement, where the link global label represents the virtual link, and the virtual link is constructed on the basic link in the first network topology and has specified bandwidth. A link global label allocated to each virtual link is different. That is, the controller allocates a link global label, namely $L\text{-}GL_1$, to a virtual link that has attribute A and is constructed on a basic link in a network topology with a topology ID $TID_1$, and allocates a link global label, namely $L\text{-}LG_2$, to a virtual link that has attribute B and is constructed on the basic link in the network topology with the topology ID $TID_1$, where $L\text{-}GL_1$ and $L\text{-}LG_2$ are different.

The plurality of forwarding devices is configured to receive the link binding relationship, and generate, according to the link binding relationship, a label forwarding entry including a mapping relationship between the link global label and virtual link forwarding information, where the virtual link forwarding information includes the basic link and specified attribute processing that are corresponding to the link global label. When a packet received by a forwarding device carries a link global label (for example, a first link global label), the forwarding device finds, by searching according to the first link global label, a corresponding label forwarding entry, to determine forwarding information of a virtual link, perform specified attribute processing, and forward the first packet from a basic link corresponding to the link global label. In segment routing Segment Routing forwarding, when a forwarding device A, as an ingress forwarding device, determines that the packet is to pass through the basic link in the network topology and is to be forwarded based on the attribute requirement, a link global label of the virtual link needs to be added to the packet.

Optionally, as shown in FIG. 3A, the label forwarding entry corresponding to the link global label may include: a link global label, a basic link, and an attribute requirement. When receiving a packet, a forwarding device acquires a link global label carried in the packet, and forwards the packet based on a specified attribute requirement and over a basic link corresponding to the link global label.

Optionally, as shown in FIG. 4A, if the attribute is a bandwidth attribute, that is, assurance of quality of service (Quality of Service, QoS) needs to be provided, the label forwarding entry corresponding to the link global label may include a link global label, a basic link, and a QoS queue ID. Herein, a QoS queue is generated according to such attributes as bandwidth, which can provide assurance of specified bandwidth, and is identified by using a QoS queue ID. In this case, when receiving a packet, a forwarding device acquires a link global label (for example, a link global label $L\text{-}GL_1$) carried in the packet, and forwards the packet according to a basic link and a QoS attribute that are corresponding to the link global label $L\text{-}GL_1$. Specifically, because $L\text{-}GL_1$ corresponds to the QoS attribute, the packet needs to be forwarded according to a QoS queue that is specified by the QoS queue ID corresponding to the QoS attribute.

Optionally, the global label may be a single global label selected from global label space shared by all the forwarding devices.

Optionally, the global label may be formed by a plurality of local labels, that is, each global label includes two or more local labels. A controller allocates two or more than two local labels to each virtual network topology, two or more than two local labels allocated to a virtual network topology form a global label, and the formed global label is used to identify the virtual network topology.

Optionally, the forwarding device is a router or a switch.

Optionally, the controller may be a server or a router.

A plurality of forwarding devices is manifested as nodes in a network topology. According to a different attribute requirement of a virtual node on a basic node in the network topology, a controller may allocate a node global label to a forwarding device in the network topology based on an attribute requirement. For example, a first network topology with a topology ID $TID_1$ requires an attribute of a node be A, and then, a node global label $N\text{-}GL_1$ is allocated to a forwarding device in the first network topology based on attribute A. The node global label $N\text{-}GL_1$ represents a virtual node in the first network topology, and the virtual node is constructed on one or some forwarding devices in the first network topology and has attribute A. Then, a network topology ID, a node global label, a node identifier, and an attribute can form a binding relationship between the node global label and <the network topology ID, the basic node identifier, and the attribute>, and the binding relationship is called "node binding relationship" hereinafter. Specifically, if the attribute is a bandwidth attribute in MPLS TE attributes, the binding relationship may be a node binding relationship between a node global label and <a network topology ID, a node identifier, and bandwidth>, where the node global label represents a virtual node, and the virtual node is constructed on a forwarding device in the first network topology and has specified bandwidth.

Optionally, the controller may be an IGP controller, the attribute may be an MPLS TE attribute, and the MPLS TE attribute may include one or more of the following: bandwidth, explicit path, color, protection, FRR (Fast ReRoute, fast reroute), and SRLG (Shared Risk Link Group, shared risk link group). The forwarding device may be an IGP client, and the IGP client may be a router, a switch, or a server.

The at least one controller sends the node binding relationship to the plurality of forwarding devices.

For example, in an autonomous system, N forwarding devices form X network topologies. For one or more forwarding devices, because a virtual node may require that one or some forwarding devices in a network topology (for example, a first network topology) have an attribute, for example, requiring a transmission bandwidth of 1G, a controller needs to allocate a node global label to one or some forwarding devices in the network topology (for example, the first network topology), where the node global label represents the virtual node, and the virtual node is constructed on one or some forwarding devices in the first network topology and has specified bandwidth. A link global label allocated to each virtual link is different. A node global label allocated to each virtual node is different. That is, the controller allocates a node global label, namely $N\text{-}GL_1$, to a virtual node that has attribute A and is constructed on a specified forwarding device in a network topology with a topology ID $TID_1$, and allocates a node global label, namely $N-LG_2$, to a virtual node that has attribute A and is constructed on a specified forwarding device in the network topology with the topology ID $TID_1$, where $N-GL_1$ and $N-LG_2$ are different.

The plurality of forwarding devices is configured to receive the node binding relationship, and generate, according to the node binding relationship, a label forwarding entry including a mapping relationship between the node global label and virtual node forwarding information, where the virtual node forwarding information includes outbound interface and next hop information of an arrived-at basic node, and specified attribute processing that are corresponding to the node global label. When a packet received by a forwarding device carries a node global label (for example, a first node global label), the forwarding device finds, by searching according to the first node global label, a label forwarding entry corresponding to the first node global label, to determine forwarding information of a first virtual node, perform specified attribute processing, and forward the packet according to the outbound interface and the next hop of the arrived-at basic node corresponding to the node global label. In segment routing Segment Routing forwarding, when a forwarding device A, as an ingress forwarding device, determines that the packet is to pass through the basic node in the network topology and is to be forwarded based on the attribute requirement, a node global label of the virtual node needs to be added to the packet.

Optionally, as shown in FIG. 3B, the forwarding entry of the first node virtual network topology may include: a node global label, an outbound interface and a next hop of an arrived-at basic node, and an attribute requirement. When receiving a packet, a forwarding device acquires a node global label carried in the packet, and forwards the packet according to an outbound interface, a next hop, and an attribute requirement that are mapped from the node global label.

Optionally, as shown in FIG. 4B, if the attribute is a bandwidth attribute, that is, assurance of quality of service (Quality of Service, QoS) is required, the forwarding entry of the node virtual network topology may include a node global label, an outbound interface, a next hop, and a QoS queue ID. Herein, a QoS queue is generated according to such attributes as bandwidth, which can provide assurance of specified bandwidth, and is identified by using a QoS queue ID. In this case, when receiving a packet, a forwarding device acquires a node global label (for example, a node global label $N-GL_1$) carried in the packet, and forwards the packet according to an outbound interface 1, a next hop node 1, and a QoS attribute that are corresponding to the node global label $N-GL_1$. Specifically, because $N-GL_1$ corresponds to the QoS attribute, the packet needs to be forwarded according to a QoS queue that is specified by the QoS queue ID corresponding to the QoS attribute.

Generally, a link identifier is represented by using addresses of two ends of a link, and a node identifier is represented by using an address of a loopback Loopback interface. In the embodiment of the present invention, after virtualization, a virtual link may be identified by using a link global label, and a virtual node may be identified by using a node global label, so that nesting is actually formed, that is, further virtualization is performed on a virtualized link and a virtualized node. For example, for a basic link (for example, link 1) in network topology 1, a controller in network topology 1 may allocate a virtual link (which is represented by using XXX) identified by a first link global label (which is represented by using label $L_1$) to an upper-layer network topology 2 of network topology 1, and if network topology 2 needs to further construct, on the virtual link XXX, a virtual link YYY to be allocated to an upper-layer network topology 3 of network topology 2, network topology 2 may allocate a second link global label (which is represented by using label $L_2$). It is assumed that the link in network topology 1 can provide an end-to-end transmission capacity of a 1G bandwidth, and that network topology 1 hopes to provide the upper-layer network topology 2 with a transmission capacity of a 100M bandwidth on link 1. Then, after a controller in network topology 1 allocates the link global label L1 to the upper-layer network topology 2, a generated link binding relationship is a binding relationship between the link global label $L_1$ and <network topology 1, link identifier 1, 100M>, and therefore, network topology 2 acquires virtual link 1 corresponding to L1, that is, a 100M transmission capacity on link 1 is acquired from network topology 1. If network topology 2 is to provide a 50M bandwidth for the upper-layer network topology 3 of network topology 2 on virtual link 1, a controller in network topology 2 allocates a link global label L2 to the upper-layer network topology 3 of network topology 2, where the link global label L2 identifies a 50M transmission capacity provided for network topology 3 on virtual link 1 in network topology 2. Therefore, a link binding relationship received by a forwarding device from the controller is a binding relationship between the link global label L1 and <network topology 2, link identifier 1, 50M>, and a 50M transmission capacity is provided for network topology 3 on virtual link 1.

Manners of allocating a node global label to a forwarding device and forwarding a packet according to a node global label are similar to cases of a link global label, and details are not described herein again.

Optionally, the global label may be a single global label selected from global label space shared by all the forwarding devices.

Optionally, the global label may be formed by a plurality of local labels, that is, each global label includes two or more local labels. A controller allocates two or more than two local labels to each virtual network topology, two or more than two local labels allocated to a virtual network topology form a global label, and the formed global label is used to identify the virtual network topology.

Optionally, the forwarding device is a router or a switch.

Optionally, the controller may be a server or a router.

In the following embodiment, that a link global label is allocated to a basic link in a network topology based on an attribute requirement is used as an example for description, and a processing method for allocating a node global label to a forwarding device based on an attribute requirement is similar.

A packet forwarding method according to an embodiment of the present invention is shown in FIG. 5. The method is applied to a network system including at least one controller and a plurality of forwarding devices, where the plurality of forwarding devices forms a plurality of network topologies, and the plurality of network topologies may include a physical network topology and a virtual network topology. The method includes:

S510A. Receive a binding relationship (the binding relationship is called "link binding relationship" hereinafter) between a link global label and <a network topology ID, a basic link identifier, and an attribute>, and generate, according to the link binding relationship, a label forwarding entry including a mapping relationship between the link global label and virtual link forwarding information, where the virtual link forwarding information includes a basic link and specified attribute processing that are corresponding to the link global label. The link binding relationship is that the at least one controller allocates, according to a different attribute requirement of a virtual link on a basic link in the network topology, a link global label to the basic link in the network topology based on the attribute requirement, and sends a link binding relationship between the link global label and <a network topology ID, a basic link identifier, and an attribute> to the plurality of forwarding devices; and a link global label allocated to each virtual link is different, where the link global label represents the virtual link, and the virtual link is constructed on the basic link in the network topology and has a specified attribute.

S512A. Receive a link binding relationship between the link global label and a virtual link, and generate, according to the link binding relationship, a label forwarding entry including a mapping relationship between the link global label and virtual link forwarding information, where the virtual link forwarding information includes a basic link and specified attribute processing that are corresponding to the link global label.

When a first packet received by a forwarding device carries a link global label (for example, a first link global label), the forwarding device finds, by searching according to the first link global label, a label forwarding entry corresponding to the first link global label, to determine forwarding information of a virtual link corresponding to the first link global label, perform first attribute processing corresponding to the first link global label, and forward the first packet from a basic link corresponding to the first link global label. In segment routing Segment Routing forwarding, when a forwarding device A, as an ingress forwarding device, determines that a received second packet is to pass through the basic link in the network topology and is to be forwarded based on a second attribute requirement, a second link global label allocated for <the network topology ID, the basic link identifier, and a second attribute> needs to be added to the second packet.

Optionally, that the controller sends the link binding relationship to the forwarding devices is specifically: the at least one controller sends the link binding relationship to forwarding devices within an IGP domain by using an IGP extension or a Path Computation Element Communication Protocol (Path Computation Element Communication Protocol, PCEP) extension.

A packet forwarding method according to an embodiment of the present invention is shown in FIG. 5B. The method is applied to a network system including at least one controller and a plurality of forwarding devices, where the plurality of forwarding devices forms a plurality of network topologies.

S510B. Receive a binding relationship between a node global label and <a network topology ID, a basic node identifier, and an attribute>.

S512B. Generate, according to the node binding relationship, a label forwarding entry including a mapping relationship between the node global label and virtual node forwarding information, where the virtual node forwarding information includes outbound interface and next hop information of an arrived-at basic node, and specified attribute processing that are corresponding to the node global label; the node binding relationship is that the at least one controller allocates, according to a different attribute requirement of a virtual node on a basic node in the network topology, a node global label to the basic node in the network topology based on the attribute requirement, and sends a node binding relationship between the node global label and <a network topology ID, a basic node identifier, and an attribute> to the plurality of forwarding devices; and a node global label allocated to each virtual node is different.

When a first packet received by the forwarding device carries a first node global label, the forwarding device finds, by searching according to the first node global label, a label forwarding entry corresponding to the first node global label, to determine forwarding information of a first virtual node corresponding to the first node global label, perform first attribute processing corresponding to the first node global label, and forward the first packet according to outbound interface and next hop information of an arrived-at basic node corresponding to the first node global label.

In segment routing Segment Routing forwarding, when a forwarding device A, as an ingress forwarding device, determines that a received second packet is to pass through the basic node in the network topology and is to be forwarded based on a second attribute requirement, a second node global label allocated for <the network topology ID, the basic node identifier, and a second attribute> needs to be added to the second packet.

Optionally, the attribute is a Multi-Protocol Label Switching Tunnel Engineering MPLS TE attribute.

Optionally, the MPLS TE attribute includes one or more of the following: bandwidth, explicit path, color, protection, fast reroute FRR, and shared risk link group SRLG.

FIG. 6 shows an example in which MPLS network virtualization is implemented by using an Open Shortest Path First (Open Shortest Path First, OSPF) extension. Herein, a binding relationship between <a network topology ID, a basic link identifier, and an MPLS TE attribute> and an MPLS global label is represented by using an extended tag-length-value (Tag-Length-Value, TLV). The following still uses a link identifier and a link global label as an example for description, and a case of a node identifier and a node global label is similar to that of a link identifier and a link global label. In FIG. 6, an MPLS Label is used to represent a value of an MPLS global label allocated to a virtual link.

An Opaque LSA (type-10 Opaque LSA is used) that carries an MPLS global label and a binding relationship between <a network topology ID, a link identifier, and an MPLS TE attribute> and the MPLS global label. A format of the LSA, as shown in FIG. 6, includes one or more MPLS Labels and other content. If the MPLS Label is that a link global label is allocated to a virtual link in a network topology, where a basic link of the virtual link has an attribute, the MPLS Label is a global label.

Figure 7:
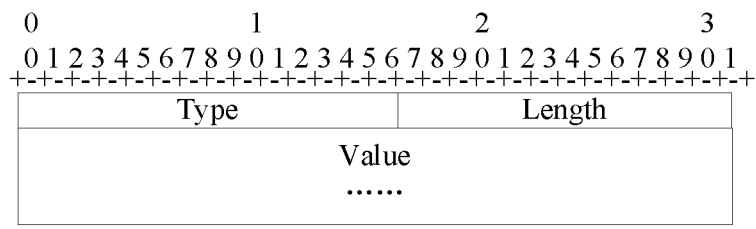
FIG. 7 is a schematic diagram of a TLV format representing a binding relationship between <a network topology ID, a basic link identifier, and an MPLS TE attribute> and an MPLS global label.

The LSA in FIG. 6 may further include one or more TLVs, where the one or more TLVs are used to represent a binding relationship between <a network topology ID, a basic link identifier, and an MPLS TE attribute> and an MPLS global label. As shown in FIG. 7, the TLV includes a TLV Value field, and values of the TLV Value field Value represent a network topology ID, a link identifier, and an MPLS TE attribute that are corresponding to the MPLS global label. That is, the LSA shown in FIG. 6 may include multiple TLVs, which are shown in FIG. 7: TLV1, TLV2, TLV3, and TLV4, where a value of TLV1 represents a network topology ID corresponding to the MPLS global label, a value of TLV2 represents a link identifier corresponding to the MPLS global label, and a value of TLV3 represents an MPLS TE attribute corresponding to the MPLS global label.

Figure 8:
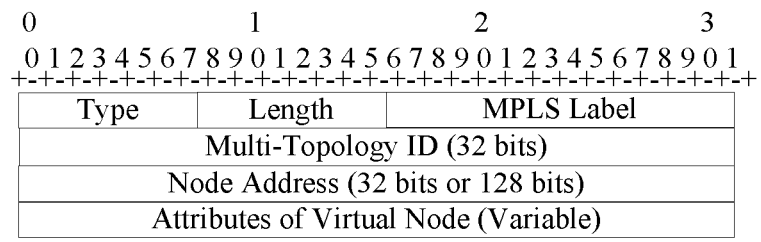
FIG. 8 is a schematic diagram of a format of a virtual node sub-TLV in IS-IS according to an embodiment of the present invention.

An ISIS label mapping TLV (IS-IS Label Mapping TLV) includes a virtual node sub-TLV (Label sub-TLV) and a forwarding equivalence class sub-TLV (FEC sub-TLV), where the virtual node sub-TLV is used to carry a node MPLS global label, and a binding relationship between the node MPLS global label and <a network topology ID, a node identifier, and an MPLS TE attribute>. As shown in FIG. 8, the virtual node sub-TLV includes: MPLS Label, Multi-Topology ID (Multi-Topology ID), Node Address (Node Address), and Attributes of Virtual Node (Attributes of Virtual Node). A value of the Multi-Topology ID field is used to represent a topology ID of a virtual network in which a virtual node is located, where a length of the Multi-Topology ID field may be 32 bits. A value of the Node Address field is used to represent a node identifier, where a length of the value of the Node Address field may be 32 bits or 128 bits. A value of the Attributes of Virtual Node field is used to represent attributes of a virtual node, where a length of the value of the Attributes of Virtual Node field is variable. A value of the MPLS Label field is used to represent a node label allocated to a virtual node that has an attribute and is in a virtual network topology. If the MPLS Label is that a node global label is allocated to a virtual node that has an attribute and is in a virtual network topology, the MPLS Label is a global label.

Figure 9:
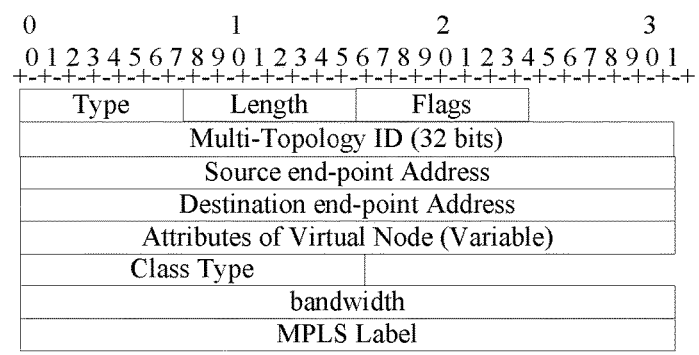
FIG. 9 is a schematic diagram of a format of a virtual link sub-TLV in ISIS according to an embodiment of the present invention.

As shown in FIG. 9, a virtual link sub-TLV implemented by using an ISIS extension is used to carry a link MPLS global label and a node binding relationship between the link MPLS global label and <a network topology ID, a link identifier, and an MPLS TE attribute>. A link identifier may be represented by using addresses of nodes at two ends of a link, that is, the link may be identified by a source end address and a destination end address of the link.

As shown in FIG. 9, a virtual link sub-TLV includes: MPLS Label, Multi-Topology ID (Multi-Topology ID), Source-end Address (Source-end Address), a Destination-end Address (Destination-end Address), Attributes of Virtual Node (Attributes of Virtual Node), Class of Type (Class of Type), and Bandwidth (Bandwidth). A value of the Multi-Topology ID field is used to represent a topology ID of a virtual network in which a virtual link is located, where a length of the value of the Multi-Topology ID field may be 32 bits. A value of the Source end Address field is used to represent a source end identifier, and a length of the Source end Address field may be that of a 32-bit IPv4 address or that of a 128-bit IPv6 address. A value of the Destination end Address field is used to represent a destination end identifier, and a length of the Destination end Address field may be that of a 32-bit IPv4 address or that of a 128-bit IPv6 address. A value of the Attributes of Virtual Node field is used to represent attributes of a virtual node, where a length of the value of the Attributes of Virtual Node field is variable. A value of the MPLS Label field is used to represent a node label allocated to a virtual node that has an attribute and is in a virtual network topology. If the MPLS Label is that a node global label is allocated to a virtual node that has an attribute and is in a virtual network topology, the MPLS Label is a global label; and the global label is used to identify a virtual node that has an attribute and is in a virtual network topology. The Class of Type field represents a bandwidth class of the virtual link. A value of the Bandwidth field indicates bandwidth of the virtual link.

Optionally, the global label may be a single global label selected from global label space shared by all the forwarding devices.

Optionally, the global label may be formed by a plurality of local labels, that is, each global label includes two or more local labels. A controller allocates two or more than two local labels to each virtual network topology, two or more than two local labels allocated to a virtual network topology form a global label, and the formed global label is used to identify the virtual network topology.

Optionally, the forwarding device is a router or a switch.

Optionally, the controller may be a server or a router.

According to the embodiment of the present invention, a virtual link and a virtual node can participate in Shortest Path First (Shortest Path First, SPF) calculation of a common route, and may also participate in Constrained Shortest Path First (Constrained Shortest Path First, CSPF) calculation of MPLS TE, and a generated forwarding entry includes: a network topology ID (which is represented by using a global label T), an IP address, a mask, and a value of a global label. Herein, the forwarding entry means that a value of a global label corresponding to forwarding can be found by searching according to a destination address and a mask, and that a label forwarding entry corresponding to the value of the global label includes forwarding information of a virtual link or a virtual node corresponding to the global label. Forwarding information of a virtual link or a virtual node has been described in detail above, and details are not described herein again.

A generated forwarding entry may also include a network topology ID (which is represented by using a global label T), an MPLS incoming label, and a next hop label forwarding entry (Next Hop Label Forwarding Entry, NHLFE), where the NHLFE includes an outgoing label, a label operation, and a value of a global label. Herein, the forwarding entry means that a value of a global label corresponding to forwarding can be found by searching according to the MPLS incoming label, a label forwarding entry corresponding to the value of the global label includes forwarding information of a virtual link or a virtual node corresponding to the global label. Forwarding information of a virtual link or a virtual node has been described in detail above, and details are not described herein again.

In segment routing Segment Routing, a complete path is formed by combining virtual links and nodes, and these virtual links and nodes are represented by using SIDs. SID is short for Segment ID, and is actually a value of a global label. The link global label and the node global label in the embodiment of the present invention may represent a virtual link and a virtual node that have bandwidth assurance. By path calculation, the following forwarding entry may be obtained:

(1) network topology N (which is represented by using a global label T)

IP address and mask->SID ($L_1$) (SID) ($N_1$) SID ($L_2$) SID ($N_2$) . . . .

Note: the entry herein indicates that a label stack is found by indexing according to an IP address and a mask, where the label stack represents a combination of global labels that represent virtual links and nodes, that is, to arrive at a corresponding destination IP address, a packet needs to sequentially pass the virtual links and the virtual nodes that are corresponding to the values of the global labels.

(2) topology N (which is represented by using a global label T)

SID (L/T)->SID ($L_1$) (SID) ($N_1$) SID ($L_2$) SID ($N_2$) . . . .

Note: the entry herein indicates that a label stack is found by indexing according to an SID (L/T) (that is, an MPLS incoming label), where the label stack represents a combination of global labels that represent virtual links and nodes, that is, a virtual link represented by the global label SID (L/T) corresponds to a group of virtual links and nodes.

A virtual link or a virtual node identified by an SID has a bandwidth attribute, that is, QoS assurance. Therefore, an end-to-end path formed by combining such virtual links and virtual nodes has assurance of quality of service, that is, segment routing Segment Routing with end-to-end QoS assurance is constructed. In addition, for a packet forwarded in a specific network topology, a global label identifying a topology is carried in the packet to identify a different forwarding instance in a forwarding device of an infrastructure network.

Figure 10:
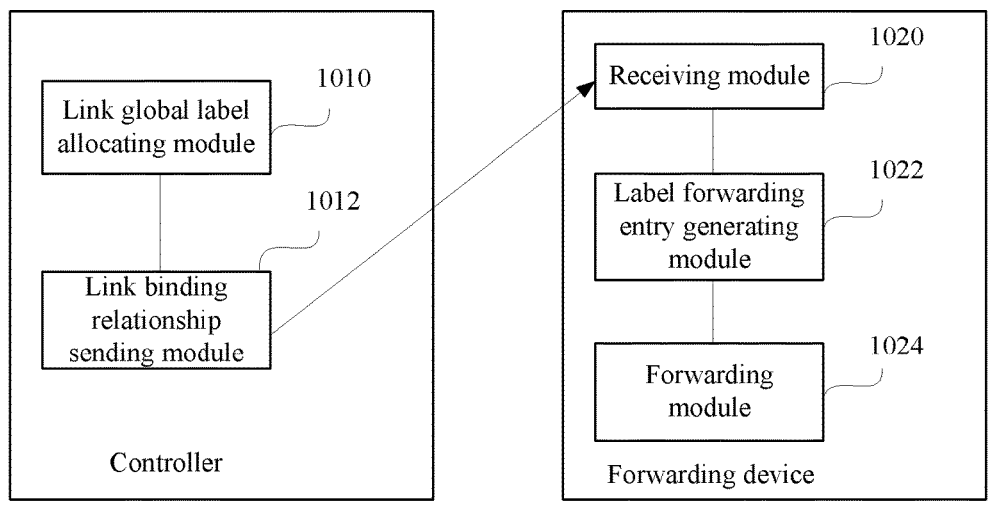
FIG. 10 is a schematic structural diagram of another network system according to an embodiment of the present invention.

As shown in FIG. 10, a network system according to an embodiment of the present invention includes at least one controller and a plurality of forwarding devices, where the plurality of forwarding devices forms a plurality of network topologies, and the plurality of network topologies may include a physical network topology and a virtual network topology.

The controller includes: a link global label allocating module 1010 and a link binding relationship sending module 1012.

The link global label allocating module 1010 is configured to allocate, according to a different attribute requirement of a virtual link on a basic link in the network topology, a link global label to the basic link in the network topology based on the attribute requirement. For example, if a basic link in a first network topology with a topology ID TID1 requires that an attribute be A, a link global label L-GL$_1$ is allocated to the basic link in the first network topology based on attribute A. In this case, the link global label L-GL$_1$ represents a virtual link in the first network topology, and the virtual link is constructed on the basic link in the first network topology and has attribute A. Then, a network topology ID, a link global label, a link identifier, and an attribute can form a binding relationship between the link global label and <the network topology ID, the link identifier, and the attribute>, where the binding relationship is called "link binding relationship" hereinafter. Specifically, if the attribute is a bandwidth attribute in MPLS TE attributes, the link binding relationship is a binding relationship between a link global label and <a network topology ID, a link identifier, and bandwidth>, where the link global label represents a virtual link, and the virtual link is constructed on a basic link in the first network topology and has specified bandwidth. A virtual global label allocated by a controller to each virtual link is different.

The link binding relationship sending module 1012 is configured to send, to the plurality of forwarding devices, the link binding relationship that is formed after the link global label allocating module 1010 allocates the link global label.

The forwarding device includes: a receiving module 1020, a label forwarding entry generating module 1022, and a forwarding module 1024.

The receiving module 1020 is configured to receive the link binding relationship between the link global label and the virtual link.

The label forwarding entry generating module 1022 is configured to generate, according to the link binding relationship, a label forwarding entry including a mapping relationship between the link global label and virtual link forwarding information, where the virtual link forwarding information includes the basic link and specified attribute processing that are corresponding to the link global label.

The forwarding module 1024 is configured to: when a first packet received by the forwarding device carries a link global label (for example, a first link global label), find, by searching according to the first link global label, a first label forwarding entry corresponding to the first link global label, to determine forwarding information of a virtual link corresponding to the first link global label, perform attribute processing corresponding to the first link global label, forward the packet from a basic link corresponding to the first link global label.

Optionally, the forwarding device may further include a link label adding module 1026; and in segment routing Segment Routing forwarding, when a forwarding device A (one of the plurality of forwarding devices), as an ingress forwarding device, determines that a received second packet is to pass through the basic link in the network topology and is to be forwarded based on a second attribute requirement, the link label adding module 1026 adds, to the second packet, a second link global label allocated for <the network topology ID, the basic link identifier, and a second attribute>.

Optionally, the link global label may be a single global label selected from global label space shared by all the forwarding devices.

Optionally, the link global label may be formed by a plurality of local labels, that is, each link global label includes two or more local labels. A controller allocates two or more than two local labels to each virtual link, two or more than two local labels allocated to a virtual link form a link global label, and the formed link global label is used to identify the virtual link.

Optionally, the forwarding device is a router or a switch.

Optionally, the controller may be a server or a router.

Figure 11:
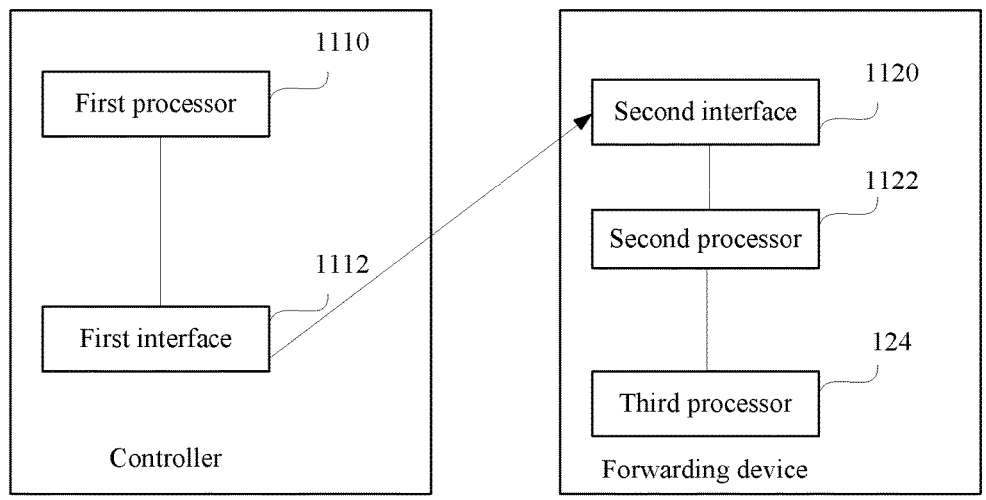
FIG. 11 is a schematic structural diagram of another network system according to an embodiment of the present invention.

As shown in FIG. 11, a network system according to an implementation manner of the present invention includes at least one controller and a plurality of forwarding devices, where the plurality of forwarding devices forms a plurality of network topologies, and the plurality of network topologies may include a physical network topology and a virtual network topology.

The controller includes: a first processor 1110 and a first interface 1112.

The first processor 1110 is configured to allocate, according to a different attribute requirement of a virtual link on a basic link in the network topology, a link global label to the basic link in the network topology based on the attribute requirement. For example, if a basic link in a first network topology with a topology ID TID$_1$ requires that an attribute be A, a link global label L-GL$_1$ is allocated to the basic link in the first network topology based on attribute A. In this case, the link global label L-GL$_1$ represents a virtual link in the first network topology, and the virtual link is constructed on a basic link in the first network topology and has attribute A. Then, a network topology ID, a link global label, a link identifier, and an attribute can form a binding relationship between the link global label and <the network topology ID, the link identifier, and the attribute>, where the binding relationship is called "link binding relationship" hereinafter. Specifically, if the attribute is a bandwidth attribute in MPLS TE attributes, the link binding relationship is a binding relationship between a link global label and <a network topology ID, a link identifier, and bandwidth>, where the link global label represents a virtual link, and the virtual link is constructed on a link in the first network topology and has specified bandwidth.

The first interface 1112 is configured to send, to the plurality of forwarding devices, the link binding relationship that is formed after the first processor 1110 allocates the link global label.

The forwarding device includes: a second interface 1120, a second processor 1122, and a third processor 1124.

The second interface 1120 is configured to receive the link binding relationship between the link global label and <the network topology ID, the basic link identifier, and the attribute>.

The second processor 1122 is configured to generate, according to the link binding relationship, a label forwarding entry including a mapping relationship between the link global label and virtual link forwarding information, where the virtual link forwarding information includes the basic link and specified attribute processing that are corresponding to the link global label.

The third processor 1124 is configured to: when a packet received by the forwarding device carries a link global label (for example, a first link global label), find, by searching according to the first link global label, a first label forwarding entry corresponding to the first link global label, to determine forwarding information of a virtual link corresponding to the first link global label, perform first attribute processing corresponding to the first link global label, and forward the packet from a basic link corresponding to the first link global label.

Optionally, the forwarding device may further include a fourth processor 1126; and in segment routing Segment Routing forwarding, when a forwarding device A (one of the plurality of forwarding devices), as an ingress forwarding device, determines that a received second packet is to pass through the basic link in the network topology and is to be forwarded based on a second attribute requirement, the fourth processor 1126 adds, to the second packet, a second link global label allocated for <the network topology ID, the basic link identifier, and a second attribute>.

Optionally, the link global label may be a single global label selected from global label space shared by all the forwarding devices.

Optionally, the link global label may be formed by a plurality of local labels, that is, each link global label includes two or more local labels. A controller allocates two or more than two local labels to each virtual link, two or more than two local labels allocated to a virtual link form a link global label, and the formed link global label is used to identify the virtual link.

Optionally, the forwarding device is a router or a switch.

Optionally, the controller may be a server or a router.

Figure 12:
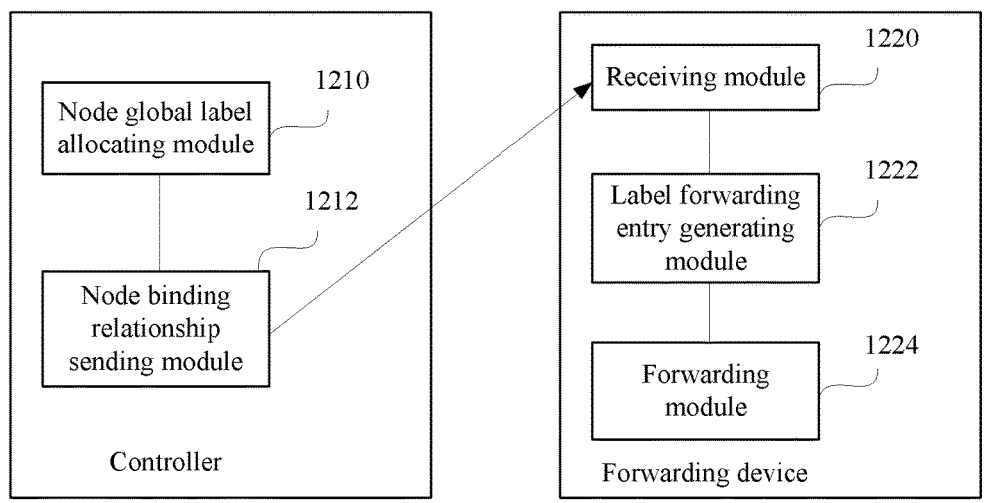
FIG. 12 is a schematic structural diagram of another network system according to an embodiment of the present invention.

As shown in FIG. 12, a network system according to an implementation manner of the present invention includes at least one controller and a plurality of forwarding devices, where the plurality of forwarding devices forms a plurality of network topologies, and the plurality of network topologies may include a physical network topology and a virtual network topology.

The controller includes: a node global label allocating module 1210 and a node binding relationship sending module 1212.

The node global label allocating module 1210 is configured to allocate, according to a different attribute requirement of a virtual node on a basic node (one or some forwarding devices) in the plurality of network topologies, a node global label to the basic node in the network topology based on the attribute requirement. For example, if a node in a first network topology with a topology ID TID1 requires that an attribute be A, a node global label N-GL$_1$ is allocated to the node in the first network topology based on attribute A. In this case, the node global label N-GL$_1$ represents a virtual node in the first network topology, and the virtual node is constructed on one or some forwarding devices in the first network topology and has attribute A. Then, a network topology ID, a node global identifier, a basic node identifier, and an attribute can form a binding relationship between the node global label and <the network topology ID, the node identifier, and the attribute>, and the binding relationship is called "node binding relationship" hereinafter. Specifically, if the attribute is a bandwidth attribute in MPLS TE attributes, the node binding relationship may be a binding relationship between a node global label and <a network topology ID, a node identifier, and bandwidth>, where the node global label represents a virtual node, and the virtual node is constructed on a forwarding device in the first network topology and has specified bandwidth. Node global labels allocated to the plurality of virtual nodes are different.

The node binding relationship sending module 1212 is configured to send, to the plurality of forwarding devices, the node binding relationship that is formed after the node global label allocating module 1210 allocates the node global label.

The forwarding device includes: a receiving module 1220, a label forwarding entry generating module 1222, and a forwarding module 1224.

The receiving module 1220 is configured to receive the node binding relationship between the node global label and <the network topology ID, the basic node identifier, and the attribute>.

The label forwarding entry generating module 1222 is configured to generate, according to the node binding relationship, a label forwarding entry including a mapping relationship between the node global label and virtual node forwarding information, where the virtual node forwarding information includes the basic node (a forwarding device) and specified attribute processing that are corresponding to the node global label.

The forwarding module 1224 is configured to: when a packet received by the forwarding module 1220 carries a node global label (for example, a first node global label), find, by searching according to the first node global label, a label forwarding entry corresponding to the first node global label, to determine forwarding information of a first virtual node corresponding to the first node global label, perform first attribute processing corresponding to the first node global label, and process, based on a first attribute corresponding to the first node global label, the packet from outbound interface and next hop information of an arrived-at basic node corresponding to the first node global label.

Optionally, the forwarding device may further include a node label adding module 1226; and in segment routing Segment Routing forwarding, when a forwarding device A (one of the plurality of forwarding devices), as an ingress forwarding device, determines that a received second packet is to pass through the basic node in the network topology and is to be forwarded based on a second attribute requirement, the node label adding module 1226 adds, to the second packet, a node global label that is of a second virtual node and is allocated for <the network topology ID, the node identifier, and a second attribute>.

Optionally, the global label may be a single global label selected from global label space shared by all the forwarding devices.

Optionally, the global label may be formed by a plurality of local labels, that is, each global label includes two or more local labels. A controller allocates two or more than two local labels to each virtual network topology, two or more than two local labels allocated to a virtual network topology form a global label, and the formed global label is used to identify the virtual network topology.

Optionally, the forwarding device is a router or a switch.

Optionally, the controller may be a server or a router.

Figure 13:
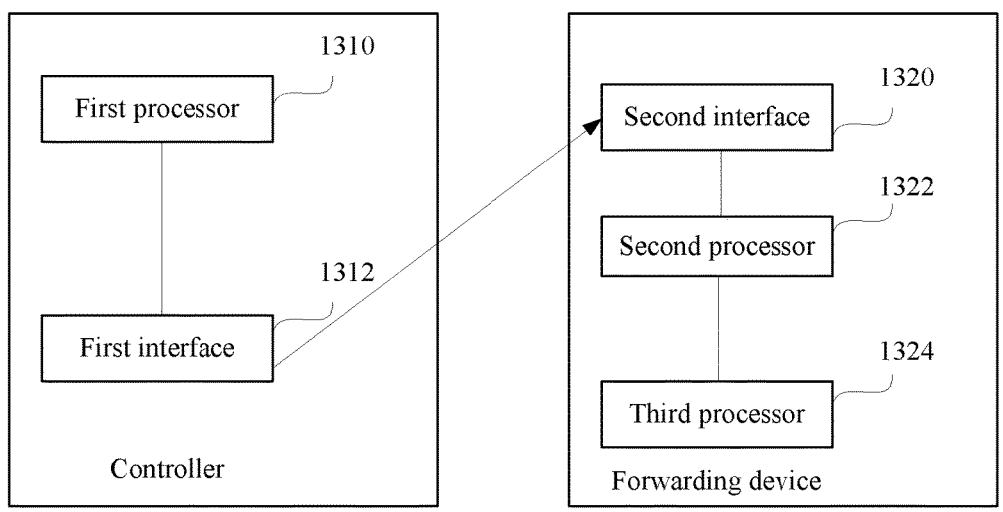
FIG. 13 is a schematic structural diagram of another network system according to an embodiment of the present invention.

As shown in FIG. 13, a network system according to an implementation manner of the present invention includes at least one controller and a plurality of forwarding devices, where the plurality of forwarding devices forms a plurality of network topologies, and the plurality of network topologies may include a physical network topology and a virtual network topology.

The controller includes: a first processor 1310 and a first interface 1312.

The first processor 1310 is configured to allocate, according to a different attribute requirement of a virtual node on a basic node in the network topology, a node global label to the basic node in the network topology based on the attribute requirement. For example, if a node in a first network topology with a topology ID $TID_1$ requires that an attribute be A, a node global label $N\text{-}GL_1$ is allocated to the node in the first network topology based on attribute A. In this case, the node global label $N\text{-}GL_1$ represents a virtual node in the first network topology, and the virtual node is constructed on a node in the first network topology and has attribute A. Then, a network topology ID, a node global identifier, a node identifier, and an attribute can form a binding relationship between the node global label and <the network topology ID, the node identifier, and the attribute>, and the binding relationship is called "node binding relationship" hereinafter. Specifically, if the attribute is a bandwidth attribute in MPLS TE attributes, the node binding relationship is a binding relationship between a node global label and <a network topology ID, a node identifier, and bandwidth>, where the node global label represents a virtual node, and the virtual node is constructed on a node in the first network topology and has specified bandwidth.

The first interface 1312 is configured to send, to the plurality of forwarding devices, the node binding relationship that is formed after the first processor 1310 allocates the node global label.

The forwarding device includes: a second interface 1320, a second processor 1322, and a third processor 1324.

The second interface 1320 is configured to receive the node binding relationship between the node global label and <the network topology ID, the node identifier, and the attribute>.

The second processor 1322 is configured to generate, according to the node binding relationship, a label forwarding entry including a mapping relationship between the node global label and virtual node forwarding information, where the virtual node forwarding information includes the basic node (a forwarding device) and specified attribute processing that are corresponding to the node global label.

The third processor 1324 is configured to: when a packet received by the second interface 1320 carries a node global label (for example, a first node global label), find, by searching according to the first node global label, a first label forwarding entry corresponding to the first node global label, to determine forwarding information of a virtual node corresponding to the first node global label, perform first attribute processing corresponding to the first node global label, and forward the packet from outbound interface and next hop information of an arrived-at basic node corresponding to the first node global label.

Optionally, the forwarding device may further include a fourth processor 1326; and in segment routing Segment Routing forwarding, when a forwarding device A, as an ingress forwarding device, determines that a received second packet is to pass through the basic node in the network topology and is to be forwarded based on a second attribute requirement, the fourth processor 1326 adds, to the second packet, a second node global label allocated for <the network topology ID, the basic node identifier, and a second attribute>.

Optionally, the global label may be a single global label selected from global label space shared by all the forwarding devices.

Optionally, the global label may be formed by a plurality of local labels, that is, each global label includes two or more local labels. A controller allocates two or more than two local labels to each virtual network topology, two or more than two local labels allocated to a virtual network topology form a global label, and the formed global label is used to identify the virtual network topology.

Optionally, the forwarding device is a router or a switch.

Optionally, the controller may be a server or a router.

According to the packet forwarding method, the controller, and the forwarding device in the embodiments of the present invention, global labels are distributed by using an IGP extension, to implement virtualization of network links and nodes, and then, an MPLS virtual network can be easily implemented. Because MPLS global labels are used for identification, physical details of an infrastructure network are totally concealed from an upper-layer virtual network, and the upper-layer virtual network does not need to perceive whether a lower link is of an Ethernet, POS or Trunk interface, which is more secure and makes a virtual network more easily operated. These virtual nodes and links can be used based on an existing outbound interface link of routing/LSP forwarding, and can also be used based on Source Routing proposed in Segment Routing. Because concepts such as bandwidth are included in a virtual link or node herein, Segment Routing with end-to-end QoS assurance can be further implemented.

In the several embodiments provided in the present application, it should be understood that the disclosed system, apparatus, and method may be implemented in other manners. For example, the described system embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit. For example, a detector, a sender, a receiver, and an acquiring unit may all be implemented by using a general central processing unit CPU, or an application specific integrated circuit (Application Specific Integrated Circuit, ASIC), or a field-programmable gate array (Field-Programmable Gate Array, FPGA).

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The storage medium includes: any medium that can store program codes, such as a U disk, a removable hard disk, a read-only memory (Read-Only memory, ROM for short), a random access memory (Random Access Memory, RAM for short), a magnetic disk, or an optical disc.

Finally, it should be noted that the foregoing embodiments are merely intended to describe the technical solutions of the present invention rather than limit the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A network system, comprising:
    at least one controller; and
    a plurality of forwarding devices, wherein the plurality of forwarding devices forms a plurality of network topologies;
    the at least one controller is configured to: allocate, according to a different attribute requirement of a virtual link on a basic link in a network topology, a link global label to the basic link in the network topology based on the attribute requirement; and send a link binding relationship between the link global label and <a network topology ID, a basic link identifier, and an attribute> to the plurality of forwarding devices, wherein link global labels allocated to different virtual link are different; and
    the plurality of forwarding devices is configured to receive the link binding relationship, and generate, according to the link binding relationship, a label forwarding entry comprising a mapping relationship between the link global label and virtual link forwarding information, wherein the virtual link forwarding information comprises the basic link and specified attribute processing that are corresponding to the link global label;
    wherein the at least one controller comprises a first processor and a first interface;
    the first processor is configured to allocate, according to a different attribute requirement of a virtual link on a basic link in the network topology, a link global label to the basic link in the network topology based on the attribute requirement; and
    the first interface is configured to send, to the plurality of forwarding devices, the link binding relationship formed after the first processor allocates the link global label.

2. The network system according to claim 1, wherein the link global label comprises two or more than two labels.

3. The network system according to claim 1, wherein each of the plurality of the forwarding devices comprise: a receiving module, a label forwarding entry generating module, and a forwarding module;
    the receiving module is configured to receive the link binding relationship between the link global label and the virtual link;
    the label forwarding entry generating module is configured to generate, according to the link binding relationship, a label forwarding entry comprising the mapping relationship between the link global label and the virtual link forwarding information; and
    the forwarding module is configured to: when a first packet received by the forwarding device carries a first link global label, find, by searching according to the first link global label, a first label forwarding entry corresponding to the first link global label, to determine forwarding information of a first virtual link corresponding to the first link global label, perform attribute processing corresponding to the first link global label, and forward the first packet from a basic link corresponding to the first link global label.

4. The network system according to claim 3, wherein the forwarding device further comprises a link label adding module; and in Segment Routing forwarding, when one forwarding device of the plurality of forwarding devices, as an ingress forwarding device, determines that a received second packet is to pass through the basic link in the network topology and is to be forwarded based on a second attribute requirement, the link label adding module adds, to the second packet, a second link global label allocated for <the network topology ID, the basic link identifier, and a second attribute>.

5. The network system according to claim 1, wherein the forwarding device comprises: a second interface, a second processor, and a third processor, wherein:
    the second interface is configured to receive the link binding relationship between the link global label and <the network topology ID, the basic link identifier, and the attribute>;
    the second processor is configured to generate, according to the link binding relationship, a label forwarding entry comprising the mapping relationship between the link global label and the virtual link forwarding information, wherein the virtual link forwarding information comprises the basic link and the specified attribute processing that are corresponding to the link global label; and
    the third processor is configured to: when a first packet received by the forwarding device carries a first link global label, find, by searching according to the first link global label, a first label forwarding entry corresponding to the first link global label, to determine forwarding information of a first virtual link corresponding to the first link global label, perform first attribute processing corresponding to the first link global label, and forward the first packet from a basic link corresponding to the first link global label.

6. The network system according to claim 5, wherein the forwarding device further comprises a fourth processor; and in Segment Routing forwarding, when one forwarding device of the plurality of forwarding devices, as an ingress forwarding device, determines that a received second packet is to pass through the basic link in the network topology and is to be forwarded based on a second attribute requirement, the fourth processor adds, to the second packet, a second link global label allocated for <the network topology ID, the basic link identifier, and a second attribute>.

7. The network system according to claim 1, wherein the attribute is a Multi-Protocol Label Switching (MPLS) Tunnel Engineering (TE) attribute.

8. The network system according to claim 7, wherein the MPLS TE attribute comprises one or more of the following: bandwidth, explicit path, color, protection, Fast Reroute (FRR), and Shared Risk Link Group (SRLG).

9. A packet forwarding method, wherein the method is applied to a network system comprising at least one controller and a plurality of forwarding devices, and the plurality of forwarding devices forms a plurality of network topologies; and the method comprises:

receiving a link binding relationship between a link global label and <a network topology ID, a basic link identifier, and an attribute>; and generating, according to the link binding relationship, a label forwarding entry comprising a mapping relationship between the link global label and virtual link forwarding information, wherein the virtual link forwarding information comprises a basic link and specified attribute processing that are corresponding to the link global label; the link binding relationship is that the at least one controller allocates, according to a different attribute requirement of a virtual link on a basic link in the network topology, a link global label to the basic link in the network topology based on the attribute requirement, and sends a link binding relationship between the link global label and <a network topology ID, a basic link identifier, and an attribute> to the plurality of forwarding devices; and a link global label allocated to each virtual link is different;

wherein, when a first packet received by a forwarding device carries a first link global label, the forwarding device finds, by searching according to the first link global label, a first label forwarding entry corresponding to the first link global label, to determine forwarding information of a first virtual link corresponding to the first link global label, perform first attribute processing corresponding to the first link global label, and forward the first packet from a basic link corresponding to the first link global label.

10. The method according to claim 9, wherein, in segment routing Segment Routing forwarding, when one forwarding device of the plurality of forwarding devices, as an ingress forwarding device, determines that a received second packet is to pass through the basic link in the network topology and is to be forwarded based on a second attribute requirement, a second link global label allocated for <a network topology ID, a basic link identifier, and a second attribute> needs to be added to the packet.

11. The method according to claim 9, wherein the attribute is a Multi-Protocol Label Switching Tunnel Engineering MPLS TE attribute.

12. The method according to claim 11, wherein the MPLS TE attribute comprises one or more of the following: bandwidth, explicit path, color, protection, Fast Reroute (FRR), and Shared Risk Link Group (SRLG).

13. A packet forwarding method, wherein the method is applied to a network system comprising at least one controller and a plurality of forwarding devices, and the plurality of forwarding devices forms a plurality of network topologies; and the method comprises:

receiving a node binding relationship between a node global label and <a network topology ID, a basic node identifier, and an attribute>; and generating, according to the node binding relationship, a label forwarding entry comprising a mapping relationship between the node global label and virtual node forwarding information, wherein the virtual node forwarding information comprises outbound interface and next hop information of an arrived-at basic node, and specified attribute processing that are corresponding to the node global label; the node binding relationship is that the at least one controller allocates, according to a different attribute requirement of a virtual node on a basic node in the network topology, a node global label to the basic node in the network topology based on the attribute requirement, and sends a node binding relationship between the node global label and <a network topology ID, a basic node identifier, and an attribute> to the plurality of forwarding devices; and a node global label allocated to each virtual node is different;

wherein, when a first packet received by a forwarding device carries a first node global label, the forwarding device finds, by searching according to the first node global label, a first label forwarding entry corresponding to the first node global label, to determine forwarding information of a first virtual node corresponding to the first node global label, perform first attribute processing corresponding to the first node global label, and forward the first packet from a basic node corresponding to the first node global label.

14. The method according to claim 13, wherein, in Segment Routing (Segment Routing) forwarding, when a forwarding device A, as an ingress forwarding device, determines that a received second packet is to pass through the basic node in the network topology and is to be forwarded based on a second attribute requirement, a second node global label allocated for <the network topology ID, the basic node identifier, and a second attribute> needs to be added to the packet.

15. The method according to claim 13, wherein the attribute is a Multi-Protocol Label Switching (MPLS) Tunnel Engineering (TE) attribute.

16. The method according to claim 15, wherein the MPLS TE attribute comprises one or more of the following: bandwidth, explicit path, color, protection, Fast Reroute (FRR), and Shared Risk Link Group (SRLG).

* * * * *

UNITED STATES PATENT AND TRADEMARK OFFICE
CERTIFICATE OF CORRECTION

PATENT NO. : 10,021,023 B2
APPLICATION NO. : 15/098790
DATED : July 10, 2018
INVENTOR(S) : Zhenbin Li et al.

Page 1 of 1

It is certified that error appears in the above-identified patent and that said Letters Patent is hereby corrected as shown below:

On the Title Page

At Column 2, Line 10, under Item [56] (References Cited), FOREIGN PATENT DOCUMENTS:
Insert -- WO 2012/055446 A1 5/2012 --, therefore.

Signed and Sealed this
Sixteenth Day of October, 2018

Andrei Iancu
*Director of the United States Patent and Trademark Office*